(12) United States Patent
Gupta et al.

(10) Patent No.: US 10,719,535 B2
(45) Date of Patent: Jul. 21, 2020

(54) SINGLE DEVICE WITH MULTIPLE PERSONAS

(71) Applicant: Microsoft Technology Licensing, LLC, Redmond, WA (US)

(72) Inventors: Anoop Gupta, Woodinville, WA (US); Roger S. Barga, Kirkland, WA (US); Pavel Curtis, Bellevue, WA (US); Raymond E. Ozzie, Seattle, WA (US); Mary P. Czerwinski, Kirkland, WA (US); Rebecca Norlander, Redmond, WA (US); Richard J McAniff, Bellevue, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 255 days.

(21) Appl. No.: 14/444,880

(22) Filed: Jul. 28, 2014

(65) Prior Publication Data
US 2014/0337352 A1   Nov. 13, 2014

Related U.S. Application Data

(63) Continuation of application No. 12/098,805, filed on Apr. 7, 2008, now abandoned.

(51) Int. Cl.
*G06F 3/048* (2013.01)
*G06F 16/28* (2019.01)
*G06Q 10/10* (2012.01)

(52) U.S. Cl.
CPC ......... *G06F 16/285* (2019.01); *G06Q 10/107* (2013.01)

(58) Field of Classification Search
CPC .. G06F 17/30598; G06F 3/048; G06Q 10/107
(Continued)

(56) References Cited

U.S. PATENT DOCUMENTS

| 5,961,582 | A | 10/1999 | Gaines |
| 6,014,135 | A | 1/2000 | Fernandes |

(Continued)

OTHER PUBLICATIONS

Afshar, "Implementing an IMS Based Network—Challenges & Lessons Learned", IEC Communications Forum at NXTcomm in Chicago, IL, At&T, Jun. 16, 2007, Retrieved on Jun. 18, 2007 at <<http://www.iec.org/events/2007/iec_forums/presentations/pdfs/A_1Siroos_Afshar_AT&T.pdf>>,14 pgs.

(Continued)

*Primary Examiner* — Mohamed Abou El Seoud
(74) *Attorney, Agent, or Firm* — Faegre Drinker Biddle & Reath LLP

(57) ABSTRACT

A single device that receives communications, resources, data, and/or other information intended for a user having multiple contact addresses is provided. The single device can receive various information intended for multiple telephone numbers, email aliases, screen names, aliases, other means of contact, or combinations thereof. The device can selectively forward the information to the user based on a current user role, user preferences, contact information, or based on other criteria. If information is to be forwarded to the user at substantially the same time as receipt, automatic means of notifying the user of the role for which the communication is intended are provided.

20 Claims, 8 Drawing Sheets

(58) Field of Classification Search
USPC .......................................................... 715/764
See application file for complete search history.

(56) References Cited

U.S. PATENT DOCUMENTS

| | | | |
|---|---|---|---|
| 6,487,584 | B1 | 11/2002 | Bunney |
| 6,512,525 | B1 | 1/2003 | Capps et al. |
| 6,671,682 | B1 | 12/2003 | Nolte et al. |
| 6,745,040 | B2 | 6/2004 | Zimmerman |
| 6,941,356 | B2 | 9/2005 | Meyerson |
| 7,086,008 | B2 | 8/2006 | Capps et al. |
| 7,162,494 | B2 | 1/2007 | Arellano |
| 7,472,277 | B2 | 12/2008 | Halcrow et al. |
| 8,126,439 | B1 | 2/2012 | Sankaranaraynan et al. |
| 8,233,882 | B2 | 7/2012 | Rogel |
| 8,539,561 | B2 | 9/2013 | Gupta et al. |
| 9,125,144 | B1 | 9/2015 | Orbach et al. |
| 2003/0120717 | A1 | 6/2003 | Callaway et al. |
| 2003/0233577 | A1 | 12/2003 | Bellino |
| 2004/0148346 | A1 | 7/2004 | Weaver et al. |
| 2004/0203768 | A1 | 10/2004 | Ylitalo et al. |
| 2005/0032475 | A1 | 2/2005 | Mauney et al. |
| 2005/0053206 | A1 | 3/2005 | Chingon et al. |
| 2005/0060532 | A1* | 3/2005 | Dorenbosch ...... H04M 1/72563 713/100 |
| 2005/0108329 | A1 | 5/2005 | Weaver et al. |
| 2005/0186977 | A1 | 8/2005 | Chiu et al. |
| 2005/0246521 | A1 | 11/2005 | Bade et al. |
| 2006/0052091 | A1 | 3/2006 | Onyon et al. |
| 2006/0074806 | A1 | 4/2006 | McKegney et al. |
| 2006/0122967 | A1* | 6/2006 | Purkayastha ..... G06F 17/30867 |
| 2006/0146057 | A1 | 7/2006 | Blythe |
| 2006/0168214 | A1 | 7/2006 | Armstrong et al. |
| 2006/0179410 | A1 | 8/2006 | Deeds |
| 2006/0242229 | A1 | 10/2006 | Kinsey et al. |
| 2006/0248094 | A1* | 11/2006 | Andrews ................ G06Q 10/00 |
| 2006/0265347 | A1 | 11/2006 | Caballero-McCann et al. |
| 2006/0276182 | A1 | 12/2006 | Feng |
| 2006/0281490 | A1 | 12/2006 | Dolgas et al. |
| 2007/0061730 | A1 | 3/2007 | O'Mahony et al. |
| 2007/0089111 | A1 | 4/2007 | Robinson et al. |
| 2007/0121869 | A1 | 5/2007 | Gorti et al. |
| 2008/0080688 | A1 | 4/2008 | Burgan et al. |
| 2008/0167016 | A1 | 7/2008 | Swanburg et al. |
| 2009/0037541 | A1 | 2/2009 | Wilson |
| 2009/0080404 | A1 | 3/2009 | Laurila et al. |
| 2009/0089185 | A1 | 4/2009 | Noures |
| 2009/0119327 | A1* | 5/2009 | Lynch ............... G06F 17/30722 |
| 2009/0125321 | A1* | 5/2009 | Charlebois ............ G06Q 30/02 705/346 |
| 2009/0157512 | A1* | 6/2009 | King ..................... G06Q 10/10 705/14.27 |
| 2009/0170479 | A1 | 7/2009 | Jarenskog |
| 2010/0190522 | A1 | 7/2010 | Orlassino |
| 2011/0061008 | A1 | 3/2011 | Gupta et al. |
| 2012/0284325 | A1 | 11/2012 | Erb |

OTHER PUBLICATIONS

Miller, et al., "Personas: Moving Beyond Role-Based Requirements Engineering", Retrieved on Aug. 20, 2007, Available at <<http://agile.csc.ncsu.edu/SEMaterials/Personas.pdf>>, 10 pgs.
Office action for U.S. Appl. No. 12/098,805, dated Jan. 28, 2014, Gupta, et al., "Single Device with Multiple Personas", 31 pages.
Office action for U.S. Appl. No. 12/098,805, dated Jun. 5, 2012, Gupta et al., "Single Device with Multiple Personas", 25 pages.
Office Action for U.S. Appl. No. 12/098,805, dated Aug. 9, 2011, Anoop Gupta, "Single Device with Multiple Personas", 19 pgs.
Office action for U.S. Appl. No. 12/098,805, dated Aug. 29, 2013, Gupta, et al., "Single Device with Multiple Personas", 32 pages.
Office action for U.S. Appl. No. 12/098,805, dated Oct. 25, 2012, Gupta et al., "Single Device with Multiple Personas", 28 pages.
Thomas, et al., "Models, Protocols, and Architectures for Secure Pervasive Computing: Challenges and Research Directions", in the Proceedings of the Second IEEE Annual Conference on Pervasive Computing and Communications Workshops, 2004, pp. 164 (5pgs.).
Wardlaw, "Intelligence and Mobility for BT's Next Generation Networks", BT Technology Journal, Jan. 2005, vol. 23, No. 1, pp. 28-47.
Office Action for U.S. Appl. No. 12/145,563, dated Jan. 6, 2015, Paul J. Hough, "Hypervisor for Managing a Device Having Distinct Virtual Portions", 19 pages.
Office Action for U.S. Appl. No. 12/145,563, dated Nov. 9, 2011, Paul J. Hough, "Hypervisor for Managing a Device Having Distinct Virtual Portions", 15 pgs.
Office action for U.S. Appl. No. 12/145,563, dated Mar. 10, 2016, Hough et al., "Hypervisor for Managing a Device Having Distinct Virtual Portions", 22 pages.
Office Action for U.S. Appl. No. 12/145,563, dated Mar. 29, 2012, Paul J. Hough, "Hypervisor for Managing a Device Having Distinct Virtual Portions", 14 pgs.
Office Action for U.S. Appl. No. 12/145,563, dated Aug. 14, 2014, Paul J. Hough, "Hypervisor for Managing a Device Having Distinct Virtual Portions", 21 pages.
Schmandt et al., "Everywhere messaging," IBM Systems Journal, vol. 39, Nos. 3 & 4, 2000, retrieved at <<http://www.research.ibm.com/journal/sj/393/part1/schmandt.html>>, 14 pages.
Office Action for U.S. Appl. No. 12/145,563, dated Mar. 22, 2017, Paul J. Hough, "Hypervisor for Managing a Device Having Distinct Virtual Portions", 18 pages.
Office action for U.S. Appl. No. 12/098,805, dated Mar. 31, 2011, Gupta et al., "Single Device with Multiple Personas", 21 pages.

* cited by examiner

SINGLE DEVICE WITH MULTIPLE PERSONAS

This U.S. Non-provisional application for Letters Patent is a continuation of and claims the benefit of priority to U.S. patent application Ser. No. 12/098,805, filed Apr. 7, 2008, the disclosure of both being incorporated by reference herein.

BACKGROUND

Wireless mobile technology has become widespread and is utilized for both personal as well as business uses. Mobile devices such as telephones, pagers, personal digital assistants (PDAs), data terminals, and the like, are designed to be carried by those who travel from place to place in the daily course of business, for personal reasons, or for both business and personal reasons.

The appeal of mobile devices is due in large part to the convenience of having such devices available regardless of where the user may be located (e.g., at home, at work, traveling, out of town, and so on). In such a manner, users can easily stay "connected". These computing devices can be accessed at almost any time and place and can contain a tremendous amount of information relating to people, organizations, general interests, and other items. Electronic storage mechanisms have enabled accumulation of massive amounts of data. For instance, data that previously required volumes of books for recordation can now be stored electronically without the expense of printing paper and with a fraction of the physical space needed for storage of paper.

There can be a proliferation of incoming communications (e.g., email, text messages, phone calls, and so forth) and a single individual can receive hundreds of communications in a single day. With this enormous amount of incoming information, it can be difficult to determine which communications are important and should be handled in a reasonable amount of time compared with those that are not as important and can be disregarded for a while. Additionally, the individual receiving the incoming communications has tasks and other duties to perform and might not have much time available for reviewing each incoming communication.

There is a growing trend for users to manage different devices for different functions, roles, or personas. A first device might be utilized for work applications (e.g., a work persona) and a second, separate device might be utilized for personal applications (e.g., a personal persona). For example, a worker might have a mobile business phone and a mobile personal phone. If the worker is conducting an activity relating to their employer, the mobile business phone is utilized. If, however, personal activities are occurring, the mobile personal phone is utilized. Thus, users that need to (or desire to) separate work and personal personas must carry duplicate devices, which can be cumbersome as well as costly. Additionally, the users can have duplicate addresses, phone numbers, and so forth, which can make supervising various types of information for different roles not only complex but also time-consuming.

SUMMARY

The following presents a simplified summary in order to provide a basic understanding of some aspects of the disclosed examples. This summary is not an extensive overview and is intended to neither identify key or critical elements nor delineate the scope of such aspects. Its purpose is to present some concepts in a simplified form as a prelude to the more detailed description that is presented later.

In accordance with one or more examples and corresponding disclosure thereof, various aspects are described in connection with providing a single device that can manage multiple personas. The device can have different domains that allow a user to seamlessly switch between the different personas. As such, a single device can provide a bridge between a work and home (or other) persona. The user can interact with the device while switching between the various personas or roles (e.g., work, personal, student, other). Further, the device can partition communications, resources and other data based on a role and all the different communications, resources, data, etc., regardless of role, can be located in a single repository.

The device can be configured to seamlessly analyze and switch between roles or personas, which can be transparent to the user. Such switching can depend on various criteria including, but not limited to, activities being performed by the device user, the individual (or device) with whom the user is communicating, preferences established by the user, time of day (e.g., after 6 p.m. switch from a work persona to a personal persona), location of the device (e.g., if at home use personal persona), or based on other criteria. In accordance with some aspects, the user might be operating in two roles at substantially the same time, which can be selectively controlled to provide a rich user experience.

Thus, a role or persona can be utilized to manage communications as well as filter resources on a communication device. For example, on a device, the role can be utilized to filter games, photographs, files, calling history, and other data and information that are readily accessible on the device.

To the accomplishment of the foregoing and related ends, one or more examples comprise the features hereinafter fully described and particularly pointed out in the claims. The following description and the annexed drawings set forth in detail certain illustrative aspects and are indicative of but a few of the various ways in which the principles of the various aspects may be employed. Other advantages and novel features will become apparent from the following detailed description when considered in conjunction with the drawings and the disclosed examples are intended to include all such aspects and their equivalents.

DETAILED DESCRIPTION

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Various aspects will be presented in terms of systems that may include a number of components, modules, and the like. It is to be understood and appreciated that the various systems may include additional components or modules and/or may not include all of the components and modules discussed in connection with the figures. A combination of these approaches may also be used. The various aspects disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

Figure 1:
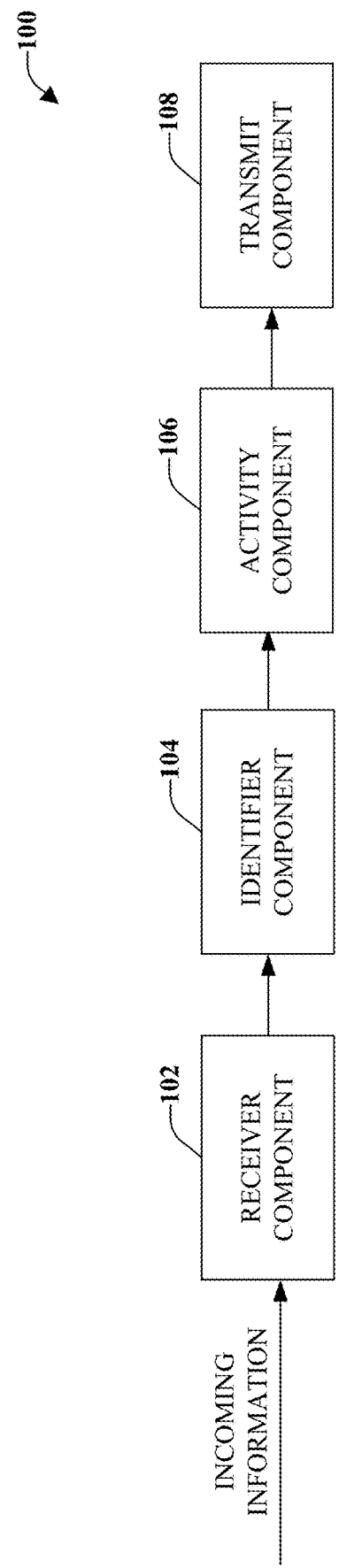
FIG. 1 illustrates a system that facilitates a single device controlling multiple personas associated with a user.

Referring initially to FIG. 1, illustrated is system 100 that facilitates a single device controlling multiple personas associated with a user and receipt of information based on a user role. The device can be any type of communication device, both wired and wireless. Many individuals have separate devices for different personas or roles. There are at least two types of roles: (1) a person as associated with their job (e.g., title, position, responsibility) and (2) a person as a private individual (e.g., personal, family) as well as other roles (e.g., a person as a member of a club, organization, friend, student, public figure, volunteer, community member, and so forth). In addition, a work-role can be common for multiple people (e.g., three different shift supervisors for each eight hour shift; the common role is "shift supervisor") and the communications, resources, or other information intended for this role or persona might not be intended for a specific person but rather for person performing the role when the various types of information is received. Each person performing the role might have a separate device and, while not performing the role, might not desire to receive information relating to the role at their device. Thus, system 100 can facilitate receipt of information based on a user role and can mitigate the need for persons not performing the role from receiving undesired communications, resources, or other information, by operating as a filter for data associated with the communication device.

In further detail, system 100 includes a receiver component 102 that can be configured to accept an input intended for a device user. The input can be any type of information including resources, phone calls, emails, text message, instant messages, or other forms of communication, data, and/or applications, which can be destined for different telephone numbers, email aliases, or other contact information, however, the final destination is intended for a single individual that might desire to maintain a single device. A recipient (e.g., device user) can be known by various contact information, such as one or more email aliases, screen names, phone numbers, or other information by which a sender can contact the recipient. Receiver component 102 can receive communications intended for one or more alias or contact names associated with the single recipient at a single device. In accordance with some aspects, the input can be received from the device user through direct interaction (e.g., keypad, mouse, touch screen, and the like) with the communication device.

An identifier component 104 can be configured to determine the user role for which the input is intended (e.g., intended user role). The intended user role can be one or more of a multitude of user roles. Each user can be performing a different role at any time of the day and can be associated with more than one role. For example, while a user is at the office, the user can be performing an office or work role. While the user is grocery shopping, that user might be performing a personal or family role. In accordance with some aspects, the user can be performing more than one role at substantially the same time. For example, at lunchtime the user may wish to be in a personal role and a work role at substantially the same time. The initiator of a communication might not be aware or concerned with the role that the user is performing at any given time or if multiple roles are being performed.

Identifier component 104 can use various criteria to determine the role for which the input is intended. Such criteria can include, but is not limited to, a contact name or alias information (including telephone number, screen name and so forth) of the recipient of the communication (device user), contact name or alias information of the sender of the input, historical information, manually configured information, location of the device, time of day, and so forth.

An activity component 106 can be configured to determine the current role of the recipient. The current role determination can be made based on the current activities of the user, a current location of the user or user device, such as by a Global Positioning System (GPS) or other locating means. Further, the current role of the recipient can be based on historical information, time of day, a manual selection by the user, or based on other criteria.

Based on the determination made by identifier component 104 and the activity component 106, a transmit component 108 can be configured to selectively present or render the input or accepted information to the recipient. The accepted information can be rendered based on the role for which the communication is intended and the role that the user is performing. If the roles match, the information is presented. For example, transmit component 108 might retain the input in a storage medium rather than transmitting the input to the user if the user is not actively engaged in the role for which the input was intended (e.g., user is at home and a work communication is received). Transmit component 108 can selectively retain (e.g., place in a storage medium) the input if the roles do not match. Later, when the user transitions into the role for which the input is intended (e.g., a change in status from one persona to another persona), the input can be automatically presented in any perceivable format (e.g., audio, video, text).

In accordance with some aspects, transmit component 108 can provide various manners of selectively presenting the input. For example, transmit component 108 can output ring tones that are unique for each communication role. Upon perceiving the ring tone, the user can determine whether to accept (or deny) that input, regardless of the role in which the recipient is currently engaged. This can be useful when the user is performing two or more roles at substantially the same time. For example, the user is at lunch and desires to be in a work role and a personal role. A unique identifier (e.g., ring tone) allows the user to determine the role for which the input is intended while mitigating the amount of maintenance required by the user (e.g., the user does not have to review the incoming phone number and mentally associate the number with the caller and the intended role).

Thus, system 100 can automatically filter incoming information based on a role in which the user is engaged at the time of receipt, as well as the role for which the input is intended. Information intended for a different role can be retained, such as in a storage medium, until a transition is made into the role for which the communication is intended. In accordance with some aspects, system 100 can separate the incoming information based on the role for which it is intended and notify the recipient of the incoming information and its intended role at substantially the same time as receipt. This can allow the user to accept information that the user is interested in, no matter which role the user is actively engaged in at the time of receipt.

Figure 2:
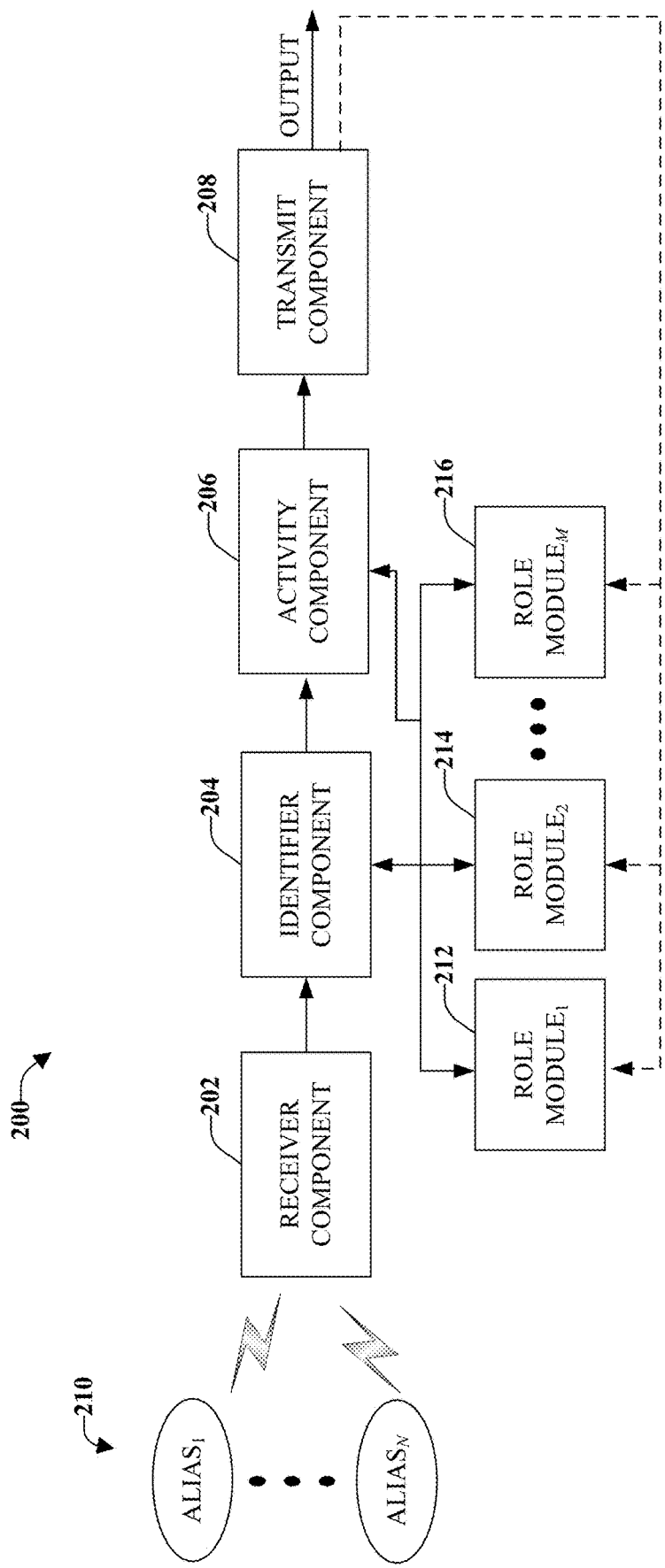
FIG. 2 illustrates a system that receives multiple persona communications and/or resources at a single device and automatically notifies the recipient.

FIG. 2 illustrates a system 200 that receives multiple persona communications and/or resources at a single device and automatically notifies the recipient. A single individual can be known to different people based on diverse interactions. For example, an individual can be a volunteer at a non-profit human rights organization. The other volunteers and staff members at the non-profit organization might be aware that the individual has a full-time job, a family, and attends night-classes at a local college. However, the friends at the non-profit organization might only associate the individual in her role as a volunteer at the non-profit organization. In fact, the individual might have a contact alias (e.g., email) for others to contact her at non-profit organization, depending on the type of volunteering. In some situations, the volunteer might desire to have a phone number at which the volunteer can be contacted without compromising the privacy of the individual (e.g., home number, work number). Thus, system 200 can allow the individual to be known by a contact alias as it relates to volunteering at the non-profit organization and receive communications and/or resources relating to the volunteer position at a single device. The single device can also receive communications and/or resources intended for the other roles engaged in by the individual (e.g., spouse, parent, student, co-worker, employee, and so on). Thus, the individual can selectively accept communications and/or resources at the single device while mitigating the need to possess multiple devices and/or manually request the communications and/or resources (e.g., log onto a different email account).

In more detail, system 200 is similar to the system of the preceding figure and includes a receiver component 202, an identifier component 204, an activity component 206, and a transmit component 208. Receiver component 202 can be configured to receive communications/resources directed (or addressed to) multiple contact pseudonyms (e.g., email alias, phone number, and so on), labeled $Alias_1$ through $Alias_N$, where N is an integer, and referred to collectively as aliases 210. The sender of the communication/resources might not be aware of the other pseudonyms by which the device user is known and/or might not be aware of the other personas or roles (e.g., contact aliases) by which the device user might be known.

At substantially the same time as the communication/resource is accepted by receiver component 202, an identifier component 204 categories the communication/resource as being intended for one or more roles or personas. There can be two or more roles that a single user might operate in at any time. For example, while traveling to work, a user might desire to be in a family role and a work role.

In some situations, a sender of the communication/resource might be aware of more than one role by which the user can be known. For example, a husband might be aware of his wife's work phone number and/or work email alias as well as other pseudonyms by which his wife might be known (e.g., home phone number, personal email account, and so forth). The husband might attempt to contact his wife based on a current role she might be in, however, system 200 mitigates the need for this distinction. Thus, the husband can contact his wife at her personal number, rather than attempting to determine which role she is in at the current time.

An activity component 206 can be configured to determine the current activity of the user. In accordance with some aspects, activity component 206 can selectively create new roles or personas for the recipient (e.g., device user) based on perceived activities of the user and/or based on new aliases at which the recipient can be contacted. Similarly, roles or personas can be deactivated or deleted if the user no longer functions in that role (e.g., no longer volunteers at an organization).

System 200 can divide the activity roles into compartments or areas on a device that maintain all communications, resources, and other information relating to each role. Thus, there can be a Role $Module_1$ 212, a Role $Module_2$ 214, through a Role $Module_M$ 216, where M is an integer. Each role module 212, 214, and 216 can occupy a different storage area within a device. Thus, the roles 212, 214, and 216 can be partitioned from the other roles by system 200, while retaining the roles in a single repository or storage media that retains or can access the different role modules 212, 214, and 216.

After the determination of the intended role and active role(s) in which the user is operating is made by identifier component 204 and activity component 206, a transmit component 208 can selectively convey the communication/resource to the user. In accordance with some aspects, transmit component 208 can place the communication/resource in its respective role module 212, 214, and 216 if the device user is not currently operating in the role for which the communication/resource was intended. When the recipient changes roles, communications/resources for the new role can be obtained from the respective role module 212, 214, and 216 and selectively presented to the user.

In accordance with some aspects, transmit component 208 can output a communication/resource at substantially the same time it is received but, depending on the role for which the communication/resource is intended, a different ring tone, bell or other perceivable means (e.g., displaying a different color on a screen for each role) can distinguish the role. The perceivable means can be established by a user (e.g., manually selected) or can be automatically configured by system 200. Providing different perceivable means can allow the recipient to distinguish the communication/resource and the recipient can accept the communication regardless of the current role of the recipient and/or if the use is functioning in multiple roles at substantially the same time. If the user does not accept the communication/resource, it can be selectively retained in a role module 212, 214, and 216 and presented later.

Figure 3:
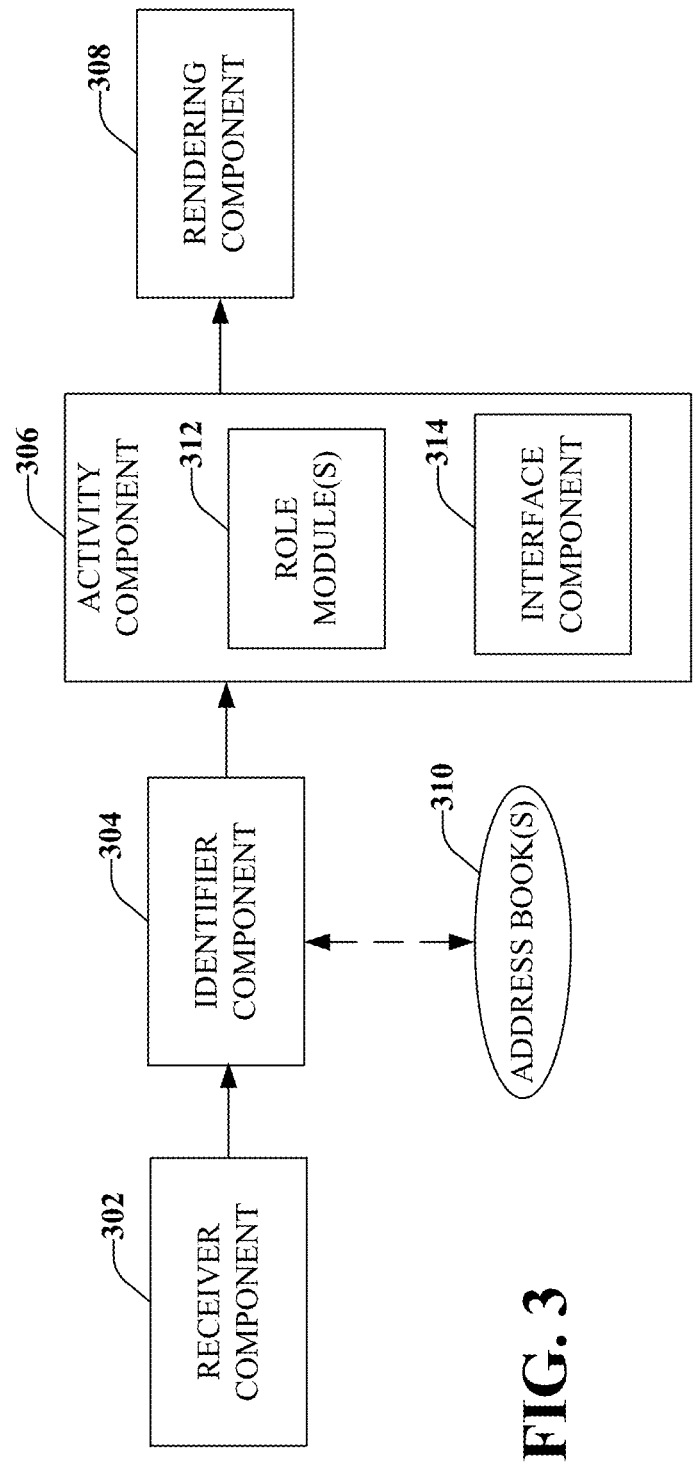
FIG. 3 illustrates a system for automatically delivering communications and/or resources intended for disparate personas on a single device.

FIG. 3 illustrates a system 300 for automatically delivering communications and/or resources (e.g. incoming data) intended for disparate personas on a single device. System 300 can enable a single device to receive incoming data intended for different contact aliases associated with a single individual. The contact aliases can be two or more different telephone numbers, email addresses, contact names, other contact information (e.g., alias or pseudonym), or combinations thereof. Although incoming data might be intended for a single individual having two or more of the same type of contact information (e.g., two or more different telephone numbers, two or more different email aliases), the incoming data is routed or transmitted through a single device. Thus, an individual can receive all incoming data at a single device, regardless of the persona or role for which the incoming data was originally intended.

System 300 includes a receiver component 302 that can be configured to receive incoming data addressed to multiple aliases associated with a single individual. An identifier component 304 can determine which alias the incoming data is intended for, an activity component 306 can determine a current user role, and a rendering component 308 can selectively present the incoming data based on a current role in which the user is operating and the role that the communication was intended for.

Identifier component 304 can determine which persona or role the incoming data is intended for based on various criteria, such as the communication alias of the person sending the incoming data, the alias to which the incoming data is sent, as well as other factors. In an example, identifier component 304 can access one or more address books 310 or contact information associated with the recipient and can compare the sender's information with the information contained in the address book 310. As used herein, address book can refer to a contact list or other directory of contacts. The communication role can be a factor of the address book in which the sender's contact information is found. In accordance with some aspects, a sender can be assigned multiple roles and can be included in two or more address books. For example, a contact at work can be assigned the role of "colleague" in an address book. However, over time, the contact might also be assigned the role "friend", allowing incoming information from that contact to be rendered when the recipient is in either (or both) a work role and a personal role.

Activity component 306 can determine a current user role based on various criteria including a location of the device, a time of day, historical information, activity of a user, and so forth. The different user roles can be maintained in role module(s) 312. Activity component 306 can include or be associated with a user interface component 314 that can be configured to receive an input relating to a recipient's current role. The recipient's current role can be entered manually and/or a current user role that was automatically assigned can be manually changed or overrode. Interface component 310 can provide a graphical user interface (GUI), a command line interface, a speech interface, Natural Language text interface, and the like. For example, a GUI can be rendered that provides a user with a region or means to load, import, select, read, and so forth, information and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the information conveyance such as vertical and/or horizontal scroll bars for navigation and toolbar buttons to determine whether a region will be viewable can be employed.

The user can also interact with the regions to select and provide information through various devices such as a mouse, a roller ball, a keypad, a keyboard, a pen, gestures captured with a camera, and/or voice activation, for example. Typically, a mechanism such as a push button or the enter key on the keyboard can be employed subsequent to entering the information in order to initiate information conveyance. However, it is to be appreciated that the disclosed embodiments are not so limited. For example, merely highlighting a check box can initiate information conveyance. In another example, a command line interface can be employed. For example, the command line interface can prompt the user for information by providing a text message, producing an audio tone, or the like. The user can then provide suitable information, such as alphanumeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

Figure 4:
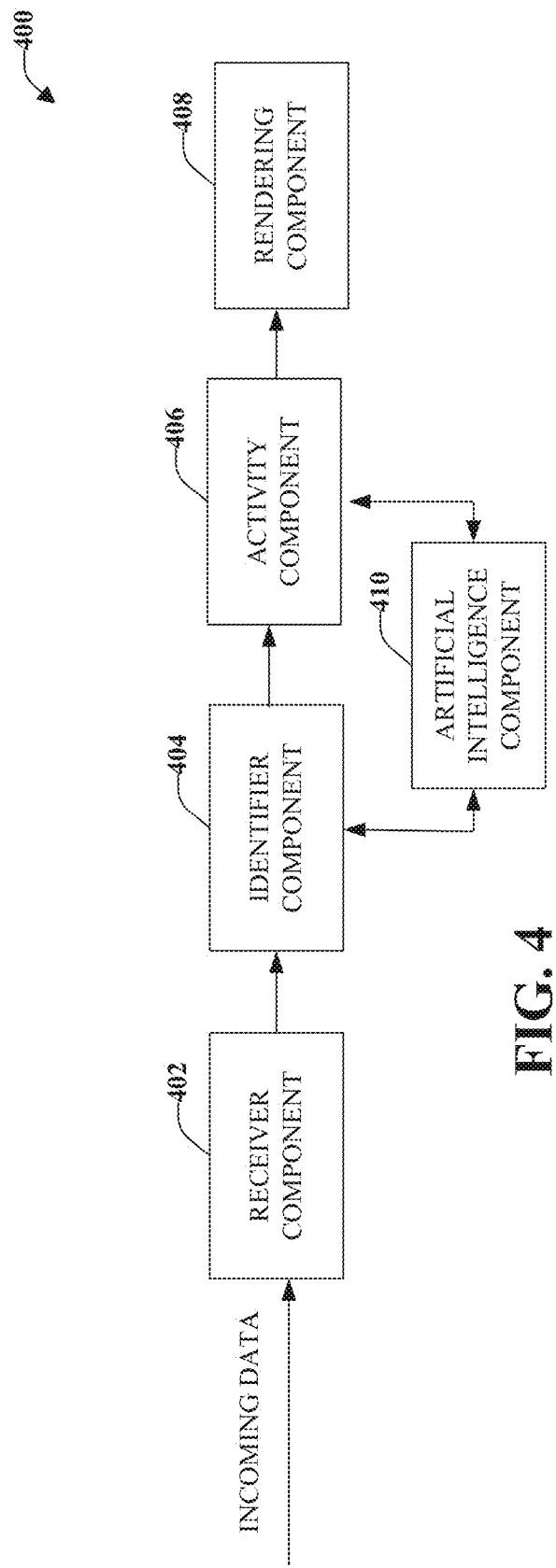
FIG. 4 illustrates a system that employs artificial intelligence, which facilitates automating one or more features in accordance with the one or more embodiments.

FIG. 4 illustrates a system 400 that employs artificial intelligence, which facilitates automating one or more features in accordance with the one or more embodiments. Artificial intelligence based systems (e.g., explicitly and/or implicitly trained classifiers) can be employed in connection with performing inference and/or probabilistic determinations and/or statistical-based determinations as in accordance with one or more aspects as described hereinafter. As used herein, the term "inference" refers generally to the process of reasoning about or inferring states of the system, environment, and/or user from a set of observations as captured through events, sensors, and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject embodiments.

System 400 can include a receiver component 402 that can be configured to accept information intended for a device user. The information can include a communication, a resource, or combinations thereof. The information can be intended for multiple user roles and routed through a single device. An identifier component 404 can be configured to determine an intended user role from at least two user roles.

The identifier component 404 can match an identification of the sender of the incoming information with contacts listed in an address book. In accordance with some aspects, an interface component allows the user to manually override a current user role automatically assigned by system 400.

Further, an activity component 406 can determine a current user role (e.g., role in which the user is currently engaged). A rendering component 408 can selectively render the accepted information based on the intended user role and the current user role. The accepted information can be rendered if the intended user role matches the current user role. If there are more than one current user roles, the information can be identified with a specific ring tone associated with one of the current user roles. The user can selectively accept or deny the information. If the intended user role does not match the current user role, the information can be placed in a queue and presented when there is a transition to the intended user role.

Artificial intelligence can be facilitated by artificial intelligence component 410 as illustrated. The various embodiments (e.g., in connection with selectively accepting and transmitting incoming communications, resources, and other data on a single device) can employ various artificial intelligence-based schemes for carrying out various aspects thereof. For example, a process for determining a particular role in which a user of the device is currently engaged can be facilitated through an automatic classifier system and process. Moreover, where information is received that might be intended for two or more user roles, the classifier can be employed to determine based on key words, key phrases, subject, time of day, location of the user, and so forth, which role the information is intended for and/or if the information is intended for multiple roles.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. In the case of incoming communications to a single device, for example, attributes can be words or phrases or other data-specific attributes derived from the words (e.g., address book, database tables, the presence of key terms), and the classes are categories or areas of interest (e.g., levels of priorities).

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the one or more embodiments can employ classifiers that are explicitly trained (e.g., through a generic training data) as well as implicitly trained (e.g., by observing user behavior, receiving extrinsic information). For example, SVM's are configured through a learning or training phase within a classifier constructor and feature selection module. Thus, the classifier(s) can be used to automatically learn and perform a number of functions, including but not limited to determining according to a predetermined criteria when to grant access, which stored procedure to execute, etc. The criteria can include, but is not limited to, the amount of data or resources to access through a call, the type of data, the importance of the data, etc.

Figure 5:
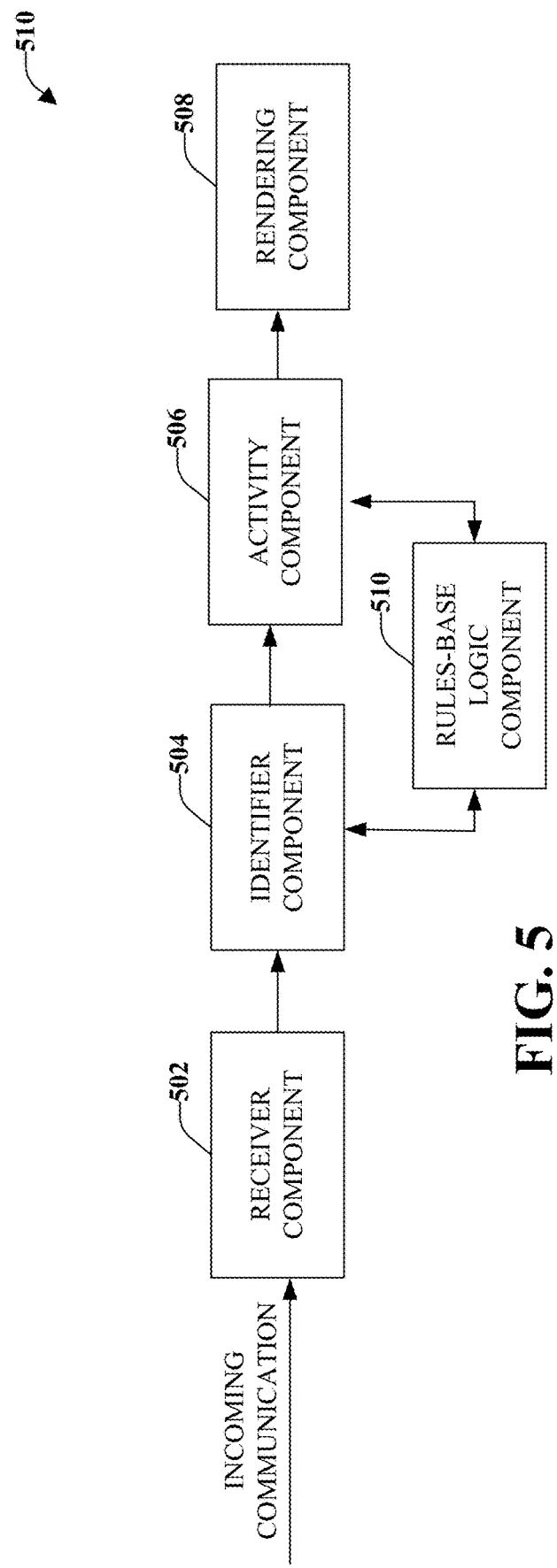
FIG. 5 illustrates a system for utilizing a single device to control multiple personas.

With reference now to FIG. 5 aspects of a system 500 for utilizing a single device for controlling multiple personas 500 is illustrated. System 500 includes a receiver component 502 that accepts communications at a single device and an identifier component 504 that determines a role for which the communication is intended. Also included is an activity component 506 that determines a current user role, which can be determined based on historical information, location of the device, time of day, activities of the user, or combinations thereof. Also included is a rendering component 508 that can output the information based on the roles. System 500 can also include a rules-based logic component 510. In accordance with this alternate aspect, an implementation scheme (e.g., rule, policy) can be applied to control and/or regulate incoming information on a single device. It will be appreciated that the rules-based implementation can automatically and/or dynamically regulate receipt and rendering of one or more communications based upon predefined criterion or policies. In response thereto, the rule-based implementation can automatically present incoming information or retain the information for presentation later by employing a predefined and/or programmed rule(s) based upon any desired criteria (e.g., intended role, user role, data importance, user preferences, historical data, and do forth).

By way of example, a user can establish a rule that can require incoming information to match a current user role before the information is presented to the user. It is to be appreciated that any preference can be facilitated through predefined or pre-programmed in the form of a rule. It is to be appreciated that the rules-based logic described with reference to FIG. 5 can be employed in addition to or in place of the artificial intelligence-based components described with reference to FIG. 4.

In view of the exemplary systems shown and described above, methodologies that may be implemented in accordance with the disclosed subject matter are provided. While, for purposes of simplicity of explanation, the methodologies are shown and described as a series of blocks, it is to be understood and appreciated that the disclosed aspects are not limited by the number or order of blocks, as some blocks may occur in different orders and/or concurrently with other blocks from what is depicted and described herein. Moreover, not all illustrated blocks may be required to implement the methodologies described herein. It is to be appreciated that the functionality associated with the blocks may be implemented by software, hardware, a combination thereof or any other suitable means (e.g. device, system, process, component). Additionally, it should be further appreciated that the methodologies disclosed hereinafter and throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 6:
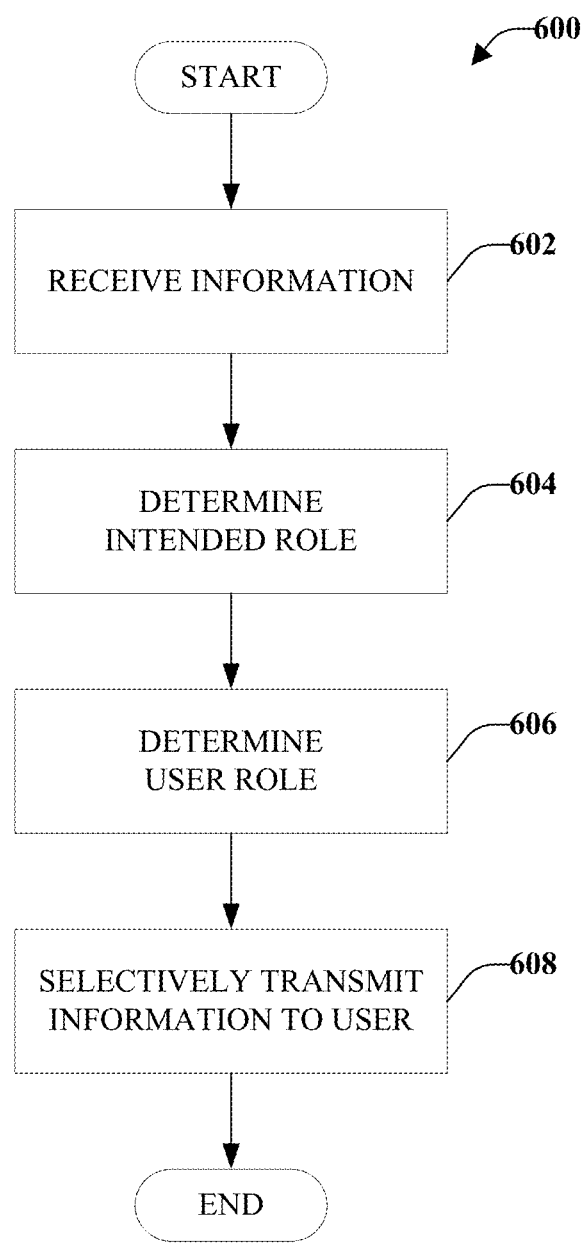
FIG. 6 illustrates a method for receiving incoming information at a single device, wherein the incoming information is intended for multiple user roles.

FIG. 6 illustrates a method 600 for receiving incoming information at a single device, wherein the incoming information is intended for multiple user roles. At 602, incoming information or data is received. The information can be addressed to a user having multiple contact names or aliases (e.g., phone numbers, email addresses, website addresses, screen names, aliases, Internet Protocol address, or other contact means). The different contact names or aliases for the user are routed though a single device. However, it should be understood that the user can receive the information at multiple devices (e.g., a laptop computer, a mobile phone, and the like). The information can be routed to all devices associated with the user and the user can be presented with the information on the active device.

The role for which the information is intended is determined, at 604. The determination can be made based on various criteria such as the sender of the information, key words or phrases in a subject or body, other information transmitted at substantially the same time, and so forth.

At 606, a determination is made as to the role in which the user of the device receiving the information is currently engaged. The user role determination can be made based on the current activities of the user. For example, if the user is utilizing a work email application, the determination can be that the user is engaging in work activities. The determination of the user role can be made based on a current location of the user or user device that is currently in use by the user (e.g., such as through a GPS or other locating means). Another manner of determining the user role can be based on historical information, such as activities carried out by the user after receiving a communication from the same sender or having similar key words, phrases, and so forth. For example, the user has previously received a communication from a particular sender and, upon perceiving the communication, has engaged in a particular activity (e.g., opening a work application, opening a personal application such as a recipe application, contacting a spouse, and so forth). These observed actions can be perceived as either a transition from one role to another role or confirmation that a current role is accurate. Still another manner of determining a user role can be made based on the time of day (e.g., if after 6:30 p.m. user is in personal role, if Monday at 11:00 a.m. the user is in a work role). Additionally or alternatively, the user might manually enter a current role in which the user is engaged. This might be desirable for situations when the user is not in a usual role (e.g., on vacation, working a different shift, and so forth). In accordance with some aspects, the user can be engaged in multiple roles at substantially the same time. In accordance with some aspects, ascertaining the intended role includes comparing a sender of the data with information contained in a contact database.

Based on the intended role and the user role, the incoming information is selectively presented to the user in any perceivable format, at 608. If the user active role and the intended role match, the information can be presented to the user at substantially the same time it is received. If the user active role and the intended role do not match, the information might be retained and not presented until the user transitions or changes into the role for which the information is intended. The information can be retained in a storage media.

In accordance with some aspects, the information is presented to the user and is distinguished based on the intended role, which provides an indication of the intended role. In accordance with some aspects, the indication is a distinct ring tone for each intended role. Thus, if the user is not engaged in a role that matches the communication or if the user is engaged in multiple roles at substantially the same time, the user still receives the incoming information but it is presented in such a manner that the user is made aware of the role for which the information is intended without having to accept the information. For example, if a work communication is received and the user is engaged in a personal or family role, a different ring tone or other identification means can be transmitted at substantially the same time as the communication to the user. The user can then determine whether to accept the communication, and potentially change roles (e.g., from personal to work) or whether to ignore or disregard the communication until later.

Thus, method 600 allows information intended for a user having multiple contact names or aliases to be received at a single device. If the intended role matches a user's current activity or role, the information can be presented to the user. However, if the information was not intended for the current user role, the information can be retained and presented later or presented based on other criteria.

Figure 7:
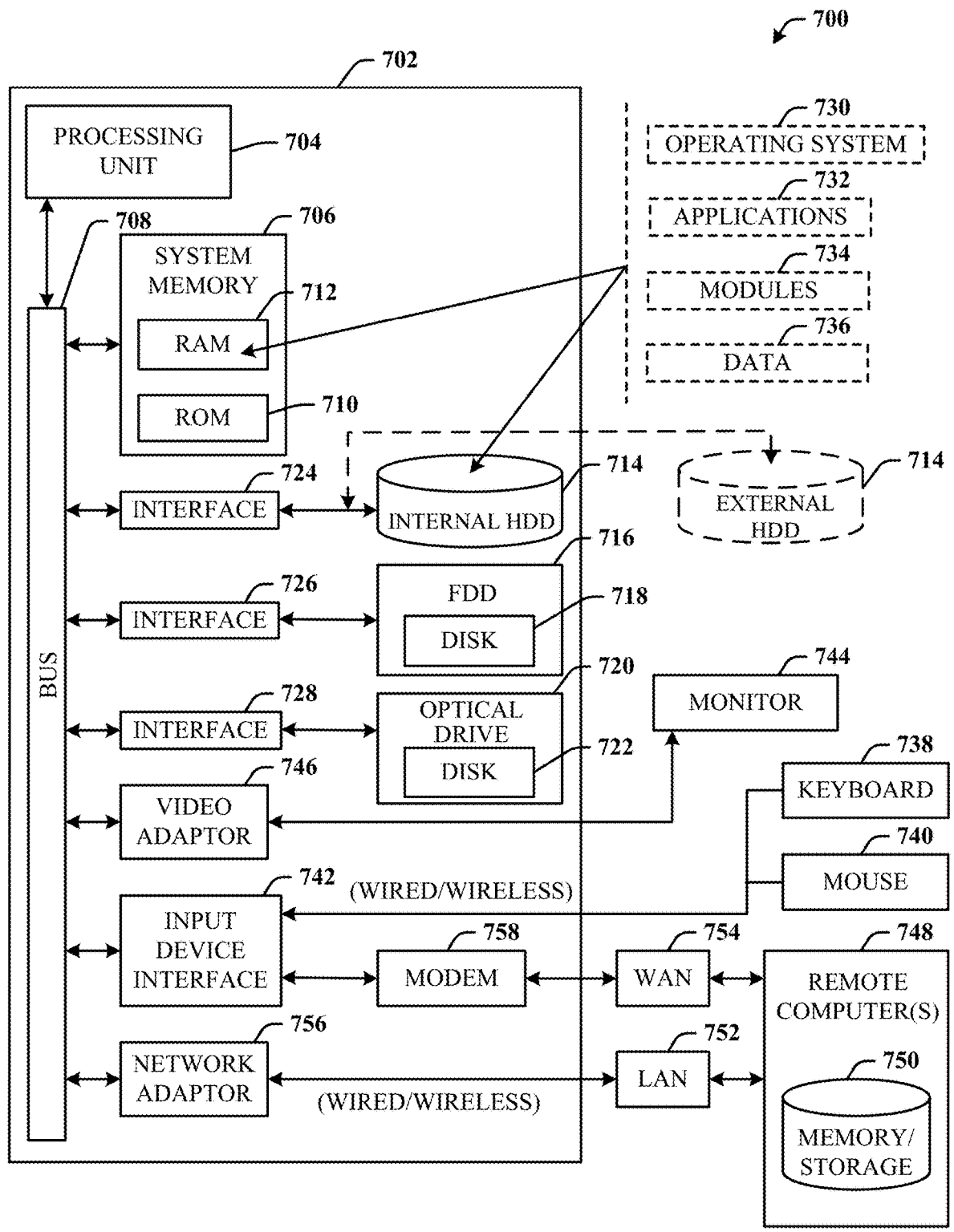
FIG. 7 illustrates a block diagram of a computer operable to execute the disclosed embodiments.

Referring now to FIG. 7, there is illustrated a block diagram of a computer operable to execute the disclosed architecture. In order to provide additional context for various aspects disclosed herein, FIG. 7 and the following discussion are intended to provide a brief, general description of a suitable computing environment 700 in which the various aspects can be implemented. While the one or more aspects have been described above in the general context of computer-executable instructions that may run on one or more computers, those skilled in the art will recognize that the various aspects also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 7, the exemplary environment 700 for implementing various aspects includes a computer 702, the computer 702 including a processing unit 704, a system memory 706 and a system bus 708. The system bus 708 couples system components including, but not limited to, the system memory 706 to the processing unit 704. The processing unit 704 can be any of various commercially available processors. Dual microprocessors and other multi-processor architectures may also be employed as the processing unit 704.

The system bus 708 can be any of several types of bus structure that may further interconnect to a memory bus (with or without a memory controller), a peripheral bus, and a local bus using any of a variety of commercially available bus architectures. The system memory 706 includes read-only memory (ROM) 710 and random access memory (RAM) 712. A basic input/output system (BIOS) is stored in a non-volatile memory 710 such as ROM, EPROM, EEPROM, which BIOS contains the basic routines that help to transfer information between elements within the computer 702, such as during start-up. The RAM 712 can also include a high-speed RAM such as static RAM for caching data.

The computer 702 further includes an internal hard disk drive (HDD) 714 (e.g., EIDE, SATA), which internal hard disk drive 714 may also be configured for external use in a suitable chassis (not shown), a magnetic floppy disk drive (FDD) 716, (e.g., to read from or write to a removable diskette 718) and an optical disk drive 720, (e.g., reading a CD-ROM disk 722 or, to read from or write to other high capacity optical media such as the DVD). The hard disk drive 714, magnetic disk drive 716 and optical disk drive 720 can be connected to the system bus 708 by a hard disk drive interface 724, a magnetic disk drive interface 726 and an optical drive interface 728, respectively. The interface 724 for external drive implementations includes at least one or both of Universal Serial Bus (USB) and IEEE 1394 interface technologies. Other external drive connection technologies are within contemplation of the one or more aspects.

The drives and their associated computer-readable media provide nonvolatile storage of data, data structures, computer-executable instructions, and so forth. For the computer 702, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods disclosed herein.

A number of program modules can be stored in the drives and RAM 712, including an operating system 730, one or more application programs 732, other program modules 734 and program data 736. All or portions of the operating system, applications, modules, and/or data can also be cached in the RAM 712. It is appreciated that the various aspects can be implemented with various commercially available operating systems or combinations of operating systems.

A user can enter commands and information into the computer 702 through one or more wired/wireless input devices, e.g., a keyboard 738 and a pointing device, such as a mouse 740. Other input devices (not shown) may include a microphone, an IR remote control, a joystick, a game pad, a stylus pen, touch screen, or the like. These and other input devices are often connected to the processing unit 704 through an input device interface 742 that is coupled to the system bus 708, but can be connected by other interfaces, such as a parallel port, an IEEE 1394 serial port, a game port, a USB port, an IR interface, etc.

A monitor 744 or other type of display device is also connected to the system bus 708 through an interface, such as a video adapter 746. In addition to the monitor 744, a computer typically includes other peripheral output devices (not shown), such as speakers, printers, etc.

The computer 702 may operate in a networked environment using logical connections through wired and/or wireless communications to one or more remote computers, such as a remote computer(s) 748. The remote computer(s) 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wired/wireless connectivity to a local area network (LAN) 752 and/or larger networks, e.g., a wide area network (WAN) 754. Such LAN and WAN networking environments are commonplace in offices and companies, and facilitate enterprise-wide computer networks, such as intranets, all of which may connect to a global communications network, e.g., the Internet.

When used in a LAN networking environment, the computer 702 is connected to the local network 752 through a wired and/or wireless communication network interface or adapter 756. The adaptor 756 may facilitate wired or wireless communication to the LAN 752, which may also include a wireless access point disposed thereon for communicating with the wireless adaptor 756.

When used in a WAN networking environment, the computer 702 can include a modem 758, or is connected to a communications server on the WAN 754, or has other means for establishing communications over the WAN 754, such as by way of the Internet. The modem 758, which can be internal or external and a wired or wireless device, is connected to the system bus 708 through the serial port interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from home, in a hotel room, or at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11(a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 8:
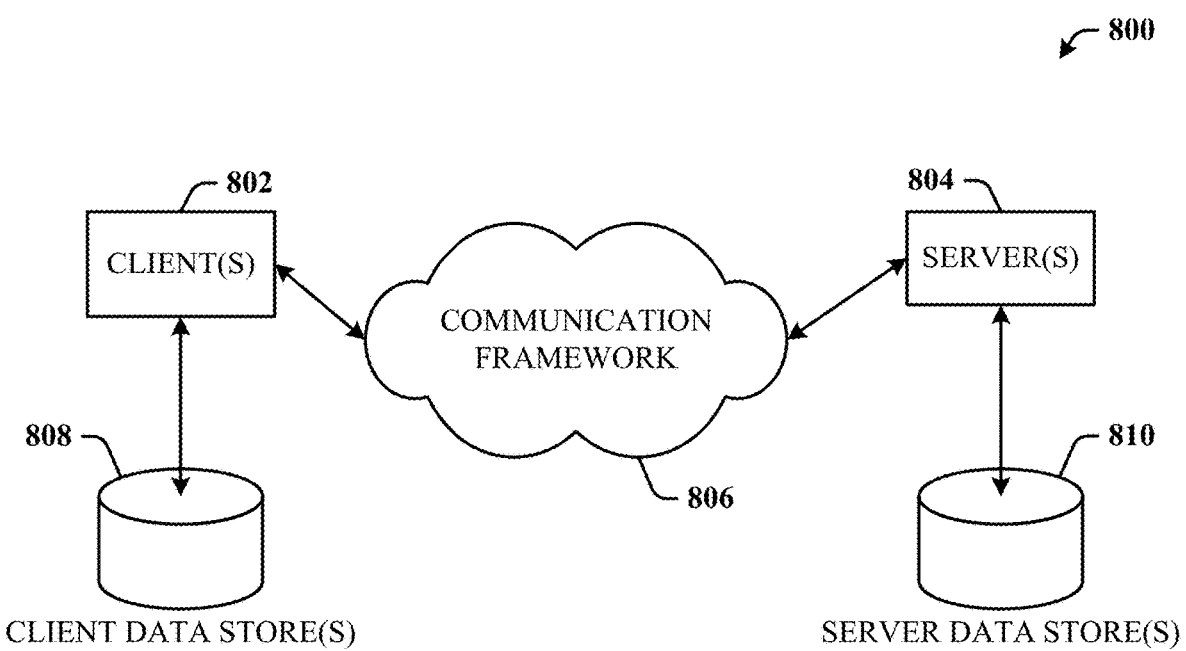
FIG. 8 illustrates a schematic block diagram of an exemplary computing environment operable to execute the disclosed embodiments.

Referring now to FIG. 8, there is illustrated a schematic block diagram of an exemplary computing environment 800 in accordance with the various aspects. The system 800 includes one or more client(s) 802. The client(s) 802 can be hardware and/or software (e.g., threads, processes, computing devices). The client(s) 802 can house cookie(s) and/or associated contextual information by employing the various aspects, for example.

The system 800 also includes one or more server(s) 804. The server(s) 804 can also be hardware and/or software (e.g., threads, processes, computing devices). The servers 804 can house threads to perform transformations by employing the various aspects, for example. One possible communication between a client 802 and a server 804 can be in the form of a data packet adapted to be transmitted between two or more computer processes. The data packet may include a cookie and/or associated contextual information, for example. The system 800 includes a communication framework 806 (e.g., a global communication network such as the Internet) that can be employed to facilitate communications between the client(s) 802 and the server(s) 804.

Communications can be facilitated through a wired (including optical fiber) and/or wireless technology. The client(s) 802 are operatively connected to one or more client data store(s) 808 that can be employed to store information local to the client(s) 802 (e.g., cookie(s) and/or associated contextual information). Similarly, the server(s) 804 are operatively connected to one or more server data store(s) 810 that can be employed to store information local to the servers 804.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification intended to embrace all such alterations, modifications, and variations.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects. In this regard, it will also be recognized that the various aspects include a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. To the extent that the terms "includes," and "including" and variants thereof are used in either the detailed description or the claims, these terms are intended to be inclusive in a manner similar to the term "comprising." The term "or" as used in either the detailed description of the claims is meant to be a "non-exclusive or".

The word "exemplary" as used herein to mean serving as an example, instance, or illustration. Any aspect or design described herein as "exemplary" is not necessarily to be construed as preferred or advantageous over other aspects or designs.

Furthermore, the one or more aspects may be implemented as a method, apparatus, or article of manufacture using standard programming and/or engineering techniques to produce software, firmware, hardware, or any combination thereof to control a computer to implement the disclosed aspects. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope of the disclosed aspects.

What is claimed is:

1. A system comprising:
   one or more processors; and
   one or more computer storage media storing computer-executable instructions that, when executed by the one or more processors, cause the one or more processors to perform actions comprising:
   accepting, from a sender, information intended for a device of a user;
   determining, from a plurality of user roles, an intended user role associated with the accepted information, the determining including comparing the sender with data contained in a contact database to ascertain the intended user role, each contact having an assigned user role of the plurality of user roles, the assigned user role assigned by the user;
   determining, after accepting the information from the sender, a current user role associated with the device based on a particular application stored on the device and based on the particular application being opened by the user after accepting the information from the sender, the particular application being previously associated with a particular user role of the plurality of user roles based on the particular application being previously opened by the user after accepting previous information from the sender; and determining whether the intended user role matches the current user role, thereby allowing the user to selectively use resources of the device of the user based on a user role.

2. The system of claim 1, wherein the actions further comprise:
presenting the accepted information in response to determining that the intended user role matches the current user role.

3. The system of claim 1, wherein the actions further comprise:
storing the accepted information in response to determining that the intended user role does not match the current user role.

4. The system of claim 3, wherein the actions further comprise:
presenting the accepted information in response to determining that a change in the current user role causes the intended user role to match the current user role.

5. The system of claim 1, wherein the particular application stored on the device and the particular application being opened by the user after accepting the information from the sender resulted in a transition from a first previous user role to a second previous user role.

6. The system of claim 1, wherein the particular application stored on the device and the particular application being opened by the user after accepting the information from the sender resulted in a confirmation that a previous current user role was accurate.

7. The system of claim 1, wherein the particular application stored on the device and the particular application being opened by the user after accepting the information from the sender comprises opening a work-related software application.

8. The system of claim 1, wherein the particular application stored on the device and the particular application being opened by the user after accepting the information from the sender comprises opening a personal software application.

9. A method comprising:
receiving first data previously sent to a device of a user;
receiving second data sent to the device of the user;
determining, from a plurality of user roles using a support vector machine, an intended user role associated with the device based on at least one key phrase of the second data and based on the at least one key phrase of the second data being similar to at least one key phrase of the first data;
determining a current role associated with the device based on the determining that the at least one key phrase of the second data is similar to the at least one key phrase of the first data, and based on a previous activity engaged in by the user in response to the receiving the first data, the previous activity including opening a particular type of application among a plurality of types of applications in response to receiving the first data, the plurality of types of applications including a work application and a personal application, and the particular type of application being previously associated with a particular user role of the plurality of user roles; and
determining whether the intended user role matches the current user role, thereby allowing the user to selectively use resources of the device of the user based on a user role.

10. The method of claim 9, further comprising:
presenting the second data in response to determining that the intended user role matches the current user role.

11. The method of claim 9, further comprising:
storing the second data in response to determining that the intended user role does not match the current user role.

12. The method of claim 11, further comprising:
presenting the second data in response to determining that a change in the current user role causes the intended user role to match the current user role.

13. The method of 9, wherein the intended user role is selected from the plurality of user roles.

14. The method of claim 9, wherein the intended user role comprises at least one of a work role and a personal role.

15. One or more non-transitory computer storage media storing computer-executable instructions that, when executed by one or more processors, cause the one or more processors to perform actions comprising:
receiving, by a user device, a communication from a sender;
determining, from a plurality of user roles, an intended user role associated with the communication, the determining including comparing the sender with data contained in a contact database to ascertain the intended user role, each contact having an assigned user role of the plurality of user roles, the assigned user role assigned by the user;
determining, after receiving the communication from the sender, a current user role associated with the user device based on a particular application stored on the user device and based on the particular application being opened by the user after receiving the communication from the sender, the particular application being previously associated with a particular user role of the plurality of user roles based on the particular application being previously opened by the user after receiving a previous communication from the sender; and
determining whether the intended user role matches the current user role, thereby allowing the user to selectively use resources of the device of the user based on a user role; and
presenting the communication in response to determining that the intended user role matches the current user role.

16. The one or more non-transitory computer storage media of claim 15, wherein the actions further comprise:
storing the communication in response to determining that the intended user role does not match the current user role.

17. The one or more non-transitory computer storage media of claim 16, wherein the actions further comprise:
presenting the communication in response to determining that a change in the current user role causes the intended user role to match the current user role.

18. The one or more non-transitory computer storage media of claim 15, wherein the particular application stored on the device and the particular application being opened by the user after receiving the communication from the sender resulted in a transition from a first previous user role to a second previous user role.

19. The one or more non-transitory computer storage media of claim 15, wherein the particular application being opened by the user after receiving the communication from the sender comprises opening a work-related software application.

20. The one or more non-transitory computer storage media of claim 15, wherein the particular application being previously opened by the user after receiving a previous communication from the sender resulted in a confirmation that a previous current user role was accurate.

\* \* \* \* \*